(12) United States Patent
Malacci et al.

(10) Patent No.: US 12,534,130 B2
(45) Date of Patent: Jan. 27, 2026

(54) STEERING ACTUATOR FOR A STEERING SYSTEM AND STEERING SYSTEM FOR A MOTOR VEHICLE

(71) Applicants: thyssenkrupp Presta AG, Eschen (LI); thyssenkrupp AG, Essen (DE)

(72) Inventors: Luca Malacci, Gams (CH); Wolfram Raither, Sevelen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 878 days.

(21) Appl. No.: 17/824,767

(22) Filed: May 25, 2022

(65) Prior Publication Data

US 2022/0379961 A1    Dec. 1, 2022

(30) Foreign Application Priority Data

May 26, 2021    (DE) .................. 10 2021 205 316.5

(51) Int. Cl.
| | | |
|---|---|---|
| *B62D 15/02* | (2006.01) | |
| *B62D 3/12* | (2006.01) | |
| *B62D 5/00* | (2006.01) | |

(52) U.S. Cl.
CPC ........... *B62D 15/0225* (2013.01); *B62D 3/12* (2013.01); *B62D 5/001* (2013.01)

(58) Field of Classification Search
CPC ....... B62D 15/0225; B62D 3/12; B62D 5/001
See application file for complete search history.

(56) References Cited

U.S. PATENT DOCUMENTS

| | | |
|---|---|---|
| 2003/0222644 A1 | 12/2003 | Okuma et al. |
| 2005/0037884 A1 | 2/2005 | Hermann et al. |
| 2005/0139029 A1 | 6/2005 | Fukizawa |
| 2005/0280389 A1 | 12/2005 | Koike et al. |
| 2020/0044591 A1 | 2/2020 | Herzog et al. |
| 2021/0221427 A1 | 7/2021 | Span et al. |

FOREIGN PATENT DOCUMENTS

| | | | |
|---|---|---|---|
| CN | 104578559 A | 4/2015 | |
| CN | 107878553 A | 4/2018 | |
| CN | 110 588 765 A | 12/2019 | |
| DE | 19 841 913 A1 | 3/2000 | |
| DE | 10222761 A1 * | 12/2003 | ............. B62D 15/02 |
| DE | 10 2004 060 959 A1 | 1/2006 | |
| DE | 102016008094 A1 * | 1/2018 | ............... B62D 3/12 |
| DE | 10 2018 213 112 A1 | 2/2020 | |
| DE | 10 2020 101481 A1 | 7/2021 | |

(Continued)

*Primary Examiner* — Jacob D Knutson
(74) *Attorney, Agent, or Firm* — thyssenkrupp North America, LLC

(57) ABSTRACT

A steering actuator for a steering system for a motor vehicle may include an actuator rod that can be displaced in translation in a longitudinal direction thereof and a position sensor apparatus that is constructed to detect a linear position of the actuator rod. In order to enable less complex production and a higher level of operational reliability, the position sensor apparatus may include a rotation sensor that has a sensor shaft that can be rotated about an axis and that has a running wheel that can roll on a corresponding linear track of the actuator rod to convert a translational movement of the actuator rod into a rotation of the sensor shaft.

16 Claims, 3 Drawing Sheets

(56) References Cited

FOREIGN PATENT DOCUMENTS

| | | | |
|---|---|---|---|
| DE | 20 2022 102496 U1 | 6/2022 | |
| EP | 1 367 360 A1 | 12/2003 | |
| FR | 2861040 A1 | 4/2005 | |
| FR | 2863240 A1 | 6/2005 | |
| JP | H05147540 A | * | 6/1993 |
| JP | H0989084 A | 3/1997 | |
| JP | H11 83415 A | 3/1999 | |
| JP | 2017 096638 A | 6/2017 | |
| WO | 2018/233849 A1 | 12/2018 | |

* cited by examiner

STEERING ACTUATOR FOR A STEERING SYSTEM AND STEERING SYSTEM FOR A MOTOR VEHICLE

CROSS REFERENCE TO RELATED APPLICATIONS

This application is a U.S. Non-Provisional application that claims priority to German Patent Application No. DE 10 2021 205 316.5, filed May 26, 2021, the entire contents of which are incorporated herein by reference.

FIELD

The present disclosure generally relates to steering systems, including steering actuators for steering systems of motor vehicles.

BACKGROUND

In a motor vehicle steering system, the mechanical steering lock of the steerable wheels is produced by means of one or more steering actuators.

A generic steering actuator has an actuator rod which can be moved in the longitudinal direction thereof generally transversely with respect to the travel direction relative to the vehicle body. In a conventional steering system, the actuator rod which is generally arranged transversely relative to the travel direction is articulated to the axle members of the two steerable wheels of a vehicle axle and, with a single-wheel articulation, accordingly connected to a single steerable wheel. The steering force of the steering actuator brings about a steering lock of the steerable wheels as a result of the translational displacement of the actuator rod.

A steering instruction can be mechanically coupled into the steering actuator, for example, by means of a manual rotation of a steering shaft of a conventional toothed rack steering gear mechanism which engages via a steering pinion in a toothed rack of the actuator rod. Alternatively or additionally, a motorised drive or auxiliary drive may be provided for reinforcement or in place of the manual steering input. As a result of the generally electric motorised drive, a steering torque can be coupled into the steering shaft or, alternatively or additionally, the actuator rod can be displaced in a motorised manner.

Steer-by-wire steering systems have no mechanical connection between a manually rotatable steering shaft and the actuator rod. The motorised drive may be integrated in the steering actuator or coupled thereto in order to convert an electrical steering instruction into a corresponding displacement of the actuator rod.

The steering lock of the steerable wheels can be detected for monitoring and controlling the steering by means of an electronic position sensor apparatus. This apparatus measures as a result of a suitable electronic sensor system, for example, using resistive, inductive, optoelectronic or other measurement methods, the current linear position of the actuator rod which clearly correlates to the steering lock. In the prior art, it is prow posed, for example, in WO 2018/233849 A1, to fit directly on the actuator rod in the longitudinal direction encoded position markings which can be read by a sensor in order to determine the longitudinal position. However, it is disadvantageous that already small contaminations of the toothed rack, for example, resulting from lubricant or dust, can impair the measurement, whereby the production is complex and the operation is relatively prone to failure.

Thus a need exists to enable less complex production and a higher level of operational reliability.

DETAILED DESCRIPTION

Figure 1:
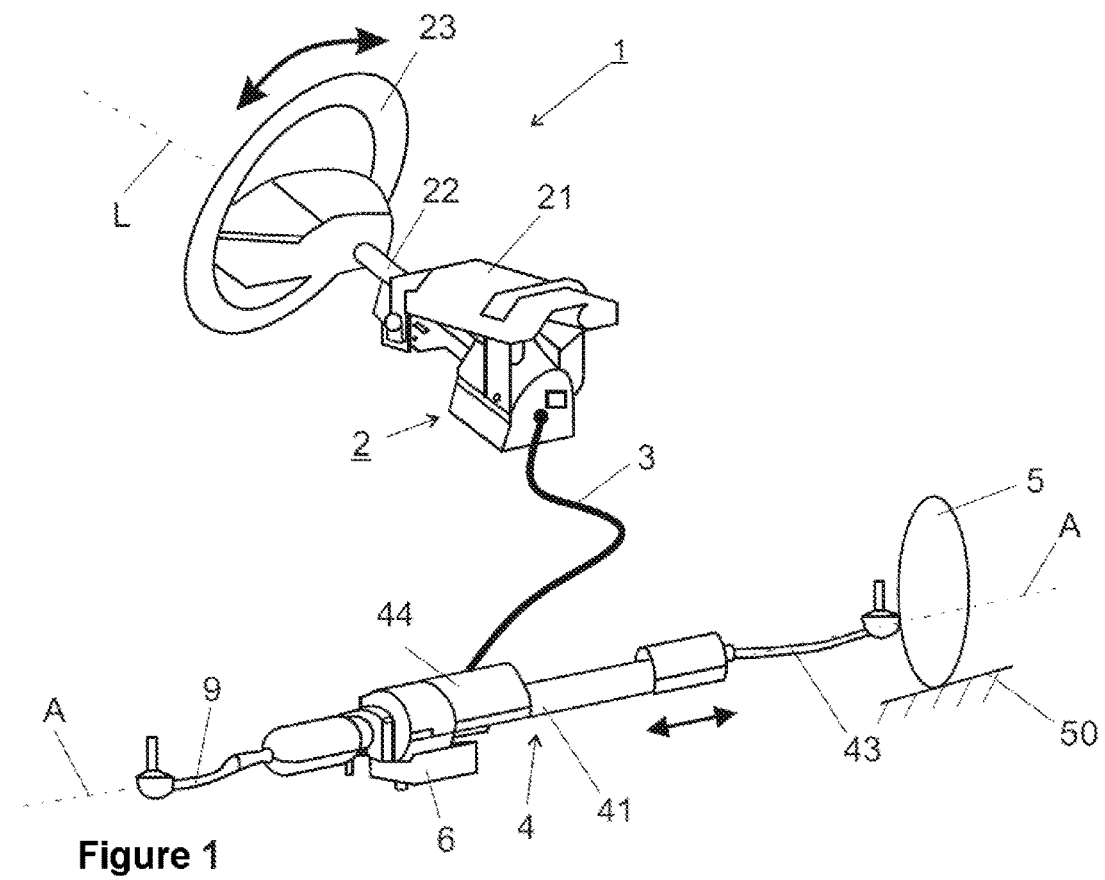
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering actuator for a steering system for a motor vehicle. In some examples, a steering actuator may comprise an actuator rod that can be displaced in translation in a longitudinal direction thereof and a position sensor apparatus that is constructed to detect the linear position of the actuator rod. The present disclosure also relates to a steering system for a motor vehicle having such a steering actuator With a steering actuator for a steering system for a motor vehicle, comprising an actuator rod which can be displaced in translation in the longitudinal direction thereof and a position sensor apparatus which is constructed to detect the linear position of the actuator rod, there is provision according to the present disclosure for the position sensor apparatus to comprise a rotation sensor which has a sensor shaft which can be rotated about an axis and which has a running wheel which can roll on a corresponding linear track of the actuator rod in order to convert a translational movement of the actuator rod into a rotation of the sensor shaft.

According to the present disclosure, the linear translational displacement of the actuator rod is converted into a rotation of a running wheel, which is connected in a rotationally engaging manner to the rotatable axis which is also referred to in an equivalent manner as a sensor axis, of a rotation sensor. The rotation sensor is arranged in a fixed manner relative to the actuator rod with respect to the longitudinal direction which corresponds to the direction of the displacement of the actuator rod, for example, in an actuator housing in which the actuator rod is displaceably supported, and which is fixed to the body of the motor vehicle. The axis of the sensor shaft is in this instance arranged transversely relative to the longitudinal direction, preferably perpendicularly to the longitudinal direction.

The running wheel which is fitted to the axle contacts with the outer circumference thereof the track which is arranged in the longitudinal direction on the actuator rod and which extends in the direction of the displacement. The outer circumference thereby rolls with a steering lock on the track and the running wheel is rotated by the value of the linear displacement of the actuator rod. As long as the running wheel rolls in a slip-free manner, which can be ensured using suitable measures, the rotation of the axle in this instance clearly correlates to the displacement of the actuator rod. Accordingly, the rotational or turning position of the axle indicates the linear position of the actuator rod.

It is possible to use as a rotation sensor an electronic angle sensor which has an angular resolution which is required for the necessary measurement precision and which with regard to the dimensions and operating properties thereof is suitable for use in the motor vehicle. For example, opto-electronic, inductive, capacitive or electronic sensors which operate in accordance with other measurement methods are known which measure accurately, are robust and non-sensitive with respect to the mechanical and thermal loads which occur during operation, for example, as a result of vibrations and temperature fluctuations. As a result of the fact that such a sensor according to the present disclosure is mechanically coupled to the actuator rod only by means of the rotatable sensor shaft, the actual measurement sensor system can be accommodated so as to be safely protected from disruptive external influences with little complexity. For example, it is possible to use rotation sensors with an encapsulated structure in which the sensor shaft is guided outwards in a sealed manner through a closed sensor housing so that the sensor is substantially protected against disruptive influences resulting from lubricant, dust or the like which can occur in the region of the actuator rod. A high level of measurement precision and operational reliability can thereby be achieved.

Another advantage is that commercially available rotation sensors can be used, wherein only a running wheel which is adapted to the respective structure of the actuator rod has to be provided and mounted. A flexible and cost-effective construction and production can thereby be achieved with relatively little complexity.

There is preferably provision for the actuator rod to be displaceably supported in an actuator housing, as known in principle from the generic construction of a steering actuator. The rotation sensor may preferably be fitted to the actuator housing or be accommodated so as to be integrated therein. The sensor shaft may also be supported in the actuator housing, which has the advantage that the running wheel is clearly positioned with respect to the track. For fitting in the motor vehicle, the actuator housing may have connection or securing means, as known in principle from the prior art.

The actuator rod may be constructed as or have a toothed rack, as known in principle from steering gear mechanisms of rack and pinion steering systems in the prior art.

There may be provision for a motorised drive to be provided for translational displacement of the actuator rod. The motorised drive is preferably an electromotive drive which is also referred to in an equivalent manner as a steering drive. This drive comprises an electric motor which is coupled to gear mechanism means in order to convert the rotation of the motor shaft into a longitudinal displacement of the actuator rod. For example, the motorised drive may have a spindle drive having a threaded spindle which is arranged coaxially on the actuator rod and which engages in a spindle nut which is supported in the actuator housing in the longitudinal direction and which can be rotatably driven by the motor. Preferably, the spindle drive may be constructed as a quiet and smooth running ball screw drive.

Alternatively, it is conceivable and possible for the motorised drive to rotatably drive a steering pinion which is fitted to a steering shaft or a drive shaft of the motorised drive or an auxiliary force drive which is in engagement with a toothed rack of the actuator rod extending in a longitudinal direction.

There may preferably be provision for the running wheel to be constructed as a gear and for the track to be constructed as a toothed rack. The toothed engagement ensures a substantially slip-free and almost play-free, positive-locking conversion of the linear displacement of the actuator rod into a corresponding rotation of the sensor shaft which is connected to the gear. A precise, robust and operationally reliable position measurement can thereby be ensured. The toothed rack can be formed directly on the actuator rod or be fitted thereto as a separate component.

It is possible for the running wheel to be in engagement with the toothed rack in which the pinion of a drive also engages in order to displace the actuator rod. This enables a compact construction type.

In an advantageous embodiment, there may be provision for the rotation sensor to be arranged or configured so as to be flexible transversely relative to the track. If during operation transversely with respect to the longitudinal direction transverse forces acting between the actuator rod and the rotation sensor occur, for example, as a result of thermal effects, load change or the like, the coupling of the rotation sensor could thereby be impaired, which could lead to excessive material loading, noise generation and increased wear. As a result of the fact that the rotation sensor is connected according to the present disclosure in a flexible manner, it may laterally give way in response to transverse forces, whereby potentially harmful material stresses and increased friction are prevented. The long-term operational reliability and smoothness can thereby advantageously be increased.

One possibility for producing a flexible arrangement is for the rotation sensor to be movably supported relative to the actuator rod. For example, a bearing arrangement which can be displaced or pivoted transversely relative to the longitudinal direction may be fitted between the rotation sensor and actuator housing. The rotation sensor can thus give way as a whole transversely to the actuator rod. An advantage in this instance is that a complete sensor sub-assembly of the rotation sensor, which can be provided, for example, as a vendor part, can be mounted in a simple manner on a flexible bearing. It is also conceivable for at least the sensor shaft to be movably supported in translation in the rotation sensor transversely relative to the axis.

In principle, there can be used all bearing arrangements which enable a relative yielding movement of the functional elements of the position sensor apparatus which are arranged according to the present disclosure in a flexible manner with respect to each other in response to transverse forces acting transversely relative to the sensor shaft. A structurally simple and operationally reliable flexible support may, for example, be produced by means of a translation or pivot bearing which may comprise a sliding or roller bearing, or a deformable bearing element.

Another advantageous embodiment of a flexible arrangement may be provided by the running wheel and/or the track having at least one compensation element which is configured in a flexible manner. The compensation element is in this instance arranged between two functional elements of the position sensor apparatus, between which the mentioned transverse forces may occur and which are according to the present disclosure arranged so as to be able to be moved in a flexible manner relative to each other. For example, the running wheel may be retained by means of a compensation element so as to be able to be moved in a flexible manner relative to the sensor shaft or, alternatively or additionally, the track may be retained by means of a compensation element so as to be able to be moved in a flexible manner relative to the actuator rod. It is also conceivable and possible to additionally or alternatively arrange or construct a compensation element between the running wheel and the track, for example, externally on the running wheel or on the track, which may, for example, comprise a flexibly deformable layer. Such a flexible layer may comprise a deformable material or have a deformable structure and may, for example, be arranged between the tooth arrangements of the gear and the toothed rack, between the gear and the sensor shaft or between the toothed rack and the actuator rod.

According to an advantageous development of the present disclosure, there may be provision for the running wheel to be resiliently pretensioned against the track. As a result of the fact that the running wheel is pressed in a flexibly resilient manner against the track, an optimised rolling action which is almost play-free and slip-free under all operating conditions can be ensured. At the same time, the flexible bearing according to the present disclosure can be achieved by the resilient deformability.

The resilient force, for example, the spring force, of the pretensioning is preferably predetermined at a value which is smaller than a maximum permissible transverse force which can act on the position sensor apparatus without impairing the function thereof. As a result, long-term wear and damage are also effectively prevented and accordingly the operational reliability is increased.

In order to produce the above-mentioned pretensioning, there may be provision for the rotation sensor to be resiliently pretensioned against the actuator rod. In this instance, the rotation sensor as a whole can be resilient loaded transversely against the actuator rod, for example, by means of resilient elements which are supported against the actuator housing and which may be constructed in a metal-like or rubber-like manner. At least the sensor shaft may be resiliently pressed in the region of the track against the actuator rod. Such resilient elements are known and are generally available with the required dimensions and resilient properties. The construction and production can be carried out with little complexity.

In an advantageous embodiment, there may be provision for the running wheel and/or the track to have at least one resilient spring element. The resilient element ensures that the running wheel and the track are resiliently pressed against each other in the region of the rolling contact. Using the resilient element, the running wheel may be configured in a resilient manner per se or be retained relative to the sensor shaft, for example, by means of a hub arrangement which is resiliently deformable in a radial direction or the like. It is also possible to fit a resilient element between the track, for example, a toothed rack and the actuator rod, for example, in the form of a flexibly resilient layer or another flat spring arrangement, for example, with leaf springs or ondular washers. Alternatively or additionally, a resilient element may be arranged or constructed externally on the running wheel or on the track, for example, as a resilient, rubber-like layer between the tooth arrangements of the gear and the toothed rack which can be fitted to the gear or the toothed rack. For example, the teeth of the gear and/or the toothed rack may be constructed in a completely or partially flexibly resilient manner, for example, by means of coating with a resilient material.

A compensation element may preferably be constructed as a resilient element. In terms of the function thereof as a compensation element, it enables as a result of the deformability thereof the flexible movability and in addition, as a result of the fact that it is itself configured in a resilient manner, it can also ensure the resilient pretensioning. As a result of this integration of the functions in a structural element, a particularly advantageous, compact, light and operationally reliable position sensor apparatus which requires a relatively low level of construction and production complexity can be produced.

Such a combined compensation and resilient element may, for example, be produced by means of a layer or another structure made of a flexibly resilient material which can be injected, for example, with an injection-moulding method, which enables a rational production.

In a steering system for a motor vehicle, comprising a steering actuator which is operationally connected to at least one steerable wheel, there is provision according to the present disclosure for the steering actuator to be constructed according to one of the embodiments described above. In this instance, all combinations of the described features may be produced.

Preferably, the steering system may be constructed as a steer-by-wire steering system. In this instance, the steering actuator has no mechanical connection to the manual steering input and, for translational displacement of the actuator rod, there is exclusively provided a motorised drive which is controlled in order to produce a steering lock by a control unit by means of electrical control signals.

The rotation sensor may be connected to an electrical control unit in order to detect and evaluate the electrical position signals. Preferably, this involves the control unit of a steer-by-wire steering system, whereby, as a result of the position sensor apparatus according to the present disclosure, an operationally reliable monitoring of the actual value of the steering lock of a steerable wheel is enabled.

FIG. 1 is a schematic illustration of a steer-by-wire steering system 1 which comprises a steering column 2. This column has a carrier unit 21 which can be mounted on a vehicle body which is not shown and of which a steering spindle 22 is rotatably supported about the longitudinal axis L thereof. At the driver-side rear end thereof in the travel direction, a steering wheel 23 is mounted on the steering spindle 22 in a rotationally secure manner in order to input manual steering instructions.

There is accommodated in the steering column 2 a rotary angle and torque detection sensor system (not illustrated in detail) which converts a steering instruction which is introduced into the steering spindle 22 as a rotation of the steering wheel 23 into an electrical control signal, that is to say, a steering signal.

The control signal is directed via an electrical control line 3 to an electrical steering actuator 4 according to the present disclosure.

The steering actuator 4—which is shown in detailed views in FIGS. 2 to 6—has an actuator housing 41 which has connection elements 410 for fitting the steering actuator 4 to a vehicle body which is not shown.

In the actuator housing 41, an actuator rod 42 which extends along an axis A, the so-called actuator axis A, transversely relative to the travel direction of the vehicle is displaceably supported in the longitudinal direction thereof which is predetermined by this axis A, as indicated with the double-headed arrow.

The two outer ends of the actuator rod 42 are in each case connected to a steerable wheel 5 by means of a tie rod 43 so that a displacement of the actuator rod 42 brings about a steering lock of the steered wheel 5 relative to the carriageway 50.

In order to produce a steering lock, the steering actuator 4 has an electromotive drive 44 which can be electrically controlled by means of the control line 3 and which comprises an electric motor which is not described in detail and which is fitted to the actuator housing 41. A spindle nut which is rotatably supported in the actuator housing 41 and which is supported in the longitudinal direction of the axis A and in which a spindle thread 45 which is formed on the actuator rod 42 engages can be rotatably driven by the motor. In this manner, there is formed in a manner known per se a linear spindle drive in which, as a result of a corresponding rotation direction of the motor, the actuator rod 42 can be moved relative to the actuator housing 41 in the longitudinal direction.

Figure 2:
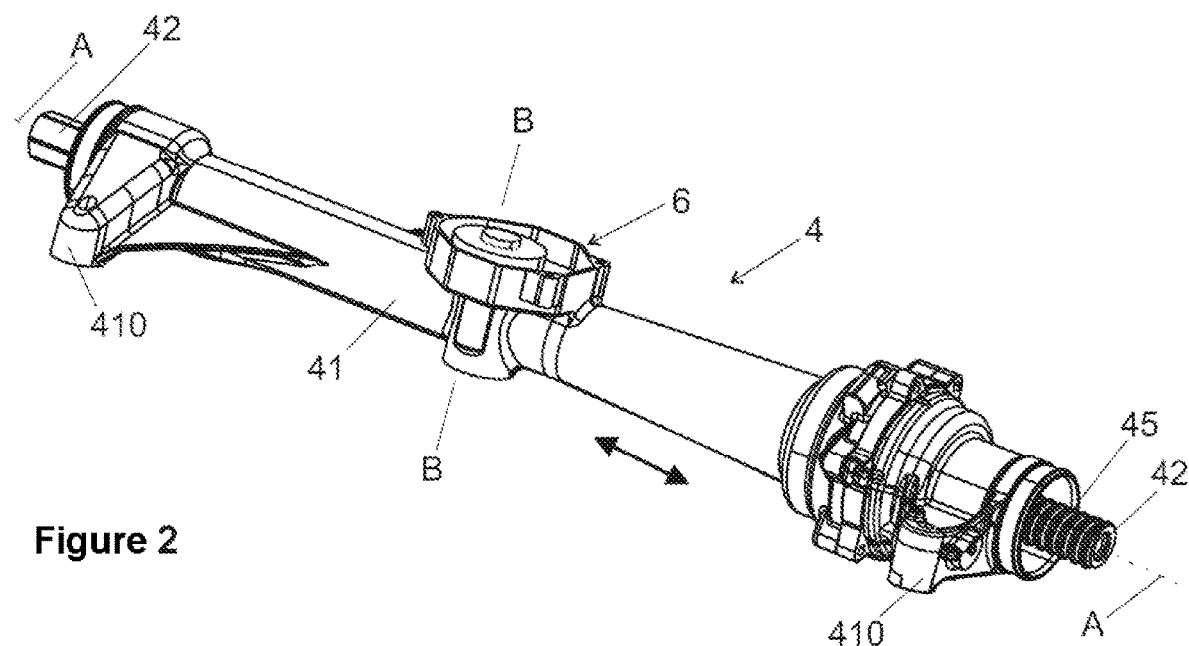
FIG. 2 is a perspective view of a steering actuator of the steering system according to FIG. 1.
Figure 3:
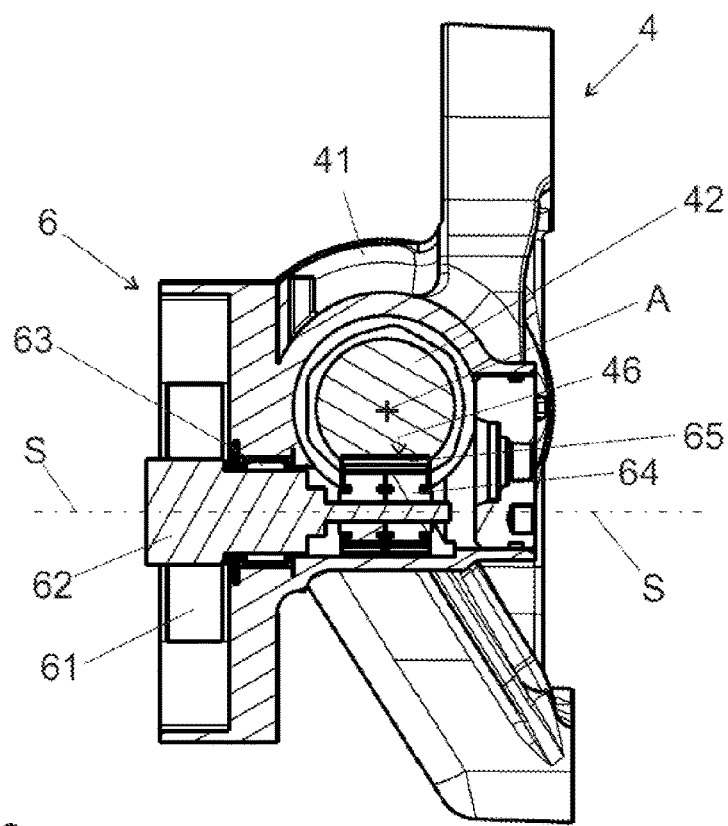
FIG. 3 is a cross sectional view through a first embodiment of a steering actuator.
Figure 4:
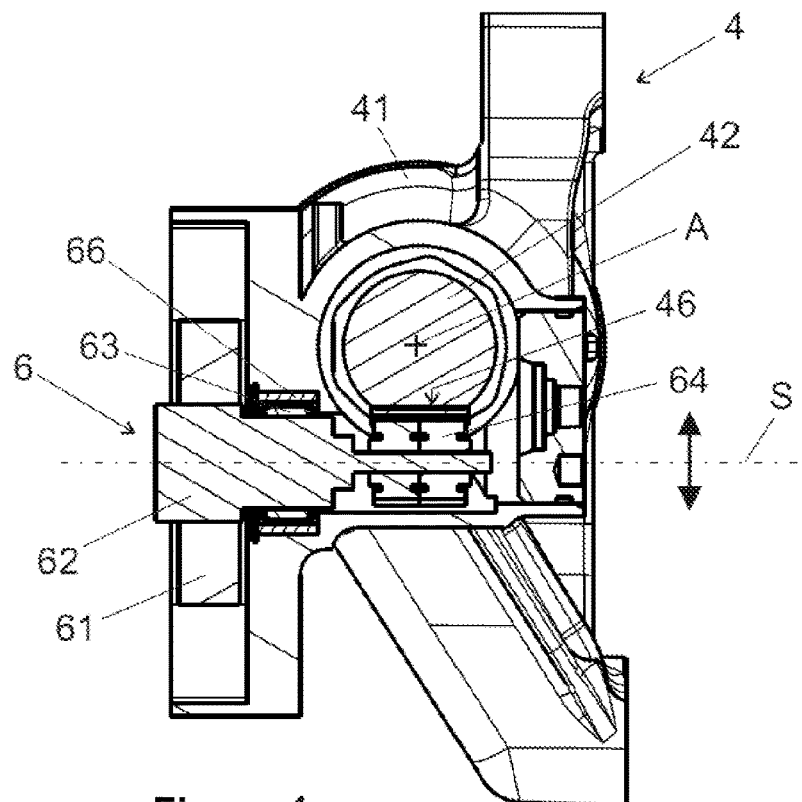
FIG. 4 is a cross sectional view through a second embodiment of a steering actuator.
Figure 5:
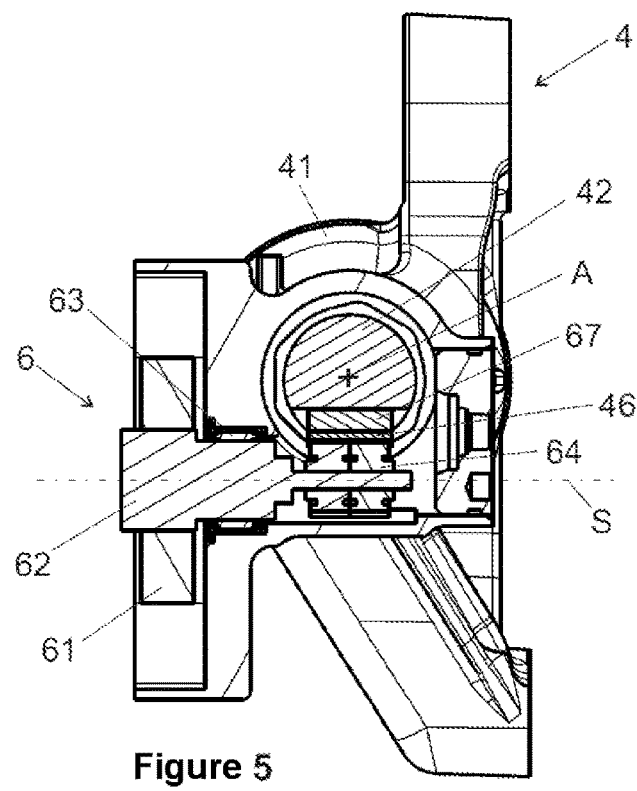
FIG. 5 is a cross sectional view through a third embodiment of a steering actuator.
Figure 6:
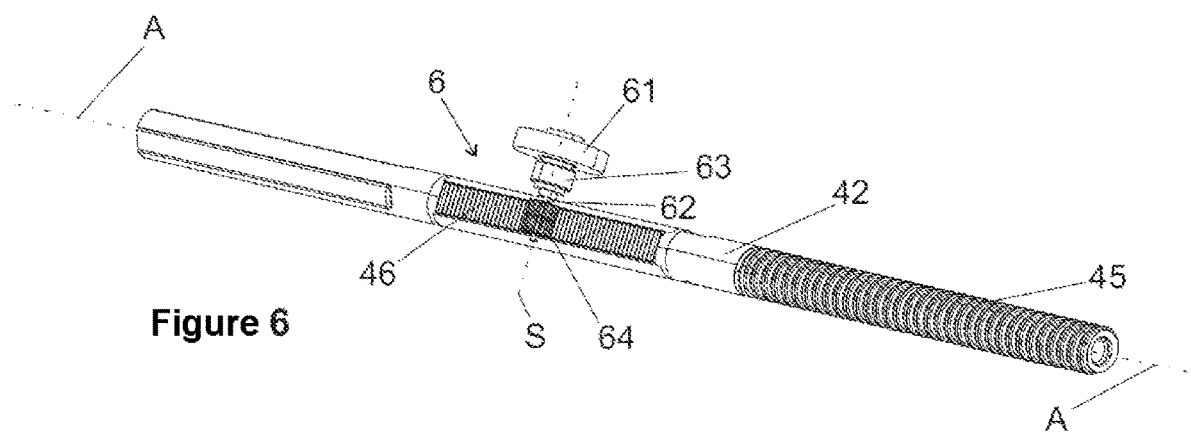
FIG. 6 is a schematic, perspective, partial view of a steering actuator with an actuator rod and a position sensor apparatus according to one of FIG. 3, 4, or 5.

The steering actuator 4 has a position sensor apparatus 6 according to the present disclosure which is illustrated in detail in the sectioned views of FIGS. 3, 4 and 5 and which each show a cross section B-B from FIG. 2. In the schematic overview of FIG. 6, the actuator housing 41 is omitted and leaves the view of the actuator rod 42 and the position sensor apparatus 6 free.

The position sensor apparatus 6 has an electric rotation sensor 62 which can operate in accordance with a measurement method known per se, for example, in an inductive, capacitive, optical manner or the like, and which detects a rotation of a sensor shaft 62 which is rotatably supported about a sensor axis S as an electrical measurement value.

The sensor shaft 62 is rotatably supported in the actuator housing 41 in a bearing 63 which may be constructed, for example, as a needle bearing.

The sensor axis S of the sensor shaft 62 is arranged transversely relative to the axis A of the actuator rod 42.

There is fitted in a rotationally secure manner to the sensor shaft 62 a gear 64 which forms a running wheel according to the present disclosure and which engages in toothed engagement in a toothed rack 46 which is fitted so as to extend on the actuator rod 42 in the longitudinal direction of the axis A and which forms a track in the context of the present disclosure. This arrangement can be clearly seen in the schematic perspective view of FIG. 6.

A linear displacement of the actuator rod 42 is converted by means of the toothed engagement in a substantially slip-free manner into a rotation of the sensor shaft 62. A linear position of the actuator rod 42 relative to the actuator housing 41 thereby clearly correlates to an angular position of the sensor shaft 62 which is detected and output as an electrical measurement value by the rotation sensor 61.

The actual electronic sensor system for detecting the angular movement of the sensor shaft 62 can be accommodated in the rotation sensor 61, so as to be protected against external influences, which can be provided and mounted as a commercially available sensor unit which can be externally sealed.

FIGS. 3, 4 and 5 show in the same view different variants of the present disclosure, wherein the same reference numerals are used. The different features can be produced in accordance with each individual embodiment, as shown in the Figures, or also in combination with each other.

In the first embodiment according to FIG. 3, a flexibly resilient compensation element 65 is arranged between the tooth arrangements of the gear 64 and the toothed rack 46. This may, for example, comprise a flexibly resilient coating on the teeth of the gear 64 and/or the toothed rack 46, wherein the gear 64 and the toothed rack 46 are pretensioned in a flexible manner with respect to each other. In this instance, the compensation element 65 can flexibly compensate for fluctuations of the spacing between the actuator rod 42 and the sensor shaft 62, that is to say, between the corresponding axes A and S, and can at the same time act as a resilient element which ensures a resiliently cushioning pretensioning of the gear 64 with respect to the toothed rack 46, which is advantageous with respect to a slip-free and play-free toothed engagement. An advantage of this arrangement is that potentially disadvantageous transverse forces on the sensor shaft 62 are resiliently absorbed and limited.

The compensation element 65 may, for example, have a thermoplastic elastomer material which may be injected on at least one of the tooth arrangements or which can be connected thereto in a different manner.

The second variant shown in FIG. 4 in the same view as in FIG. 3 has a compensation element 66, which is inserted between the bearing 63 and the actuator housing 41. This may also preferably be formed from a flexibly resilient material, for example, as a bush which receives the bearing 63 so that a resiliently flexible movement of the sensor axis 62 relative to the actuator rod 42 is enabled, as indicated with the double-headed arrow on the sensor axis S. The gear 64 is thereby resiliently pressed into toothed engagement against the toothed rack 46 and it can give way in a flexible manner relative to the axis A.

The third variant illustrated in FIG. 5 in the same view as in FIGS. 3 and 4 has a compensation element 67 which is arranged between the toothed rack 46 and the actuator rod 42. This may also preferably be formed from a flexibly resilient material so that a resiliently flexible movement of the toothed rack 46 relative to the actuator rod 42 is enabled. The toothed rack 46 is thereby pressed with respect to the axis A radially outwardly and resiliently against the gear 64 into the toothed engagement and can in this instance give way in a flexible manner relative to the axis A.

In all the embodiments shown, the rotation sensor 61 is better protected against potentially harmful influences resulting from lubricant, dust and the like than in the prior art and, as a result of the compensation element 65, 66, 67, between the axes A and S transverse forces which occur during operation are kept away from the rotation sensor 61. The arrangements of the compensation elements 65, 66, 67 can be combined with each other as required.

LIST OF REFERENCE NUMERALS

1 Steering system
2 Steering column
21 Carrier unit
22 Steering spindle
3 Control line
4 Steering actuator
41 Actuator housing
410 Connection element
42 Actuator rod
43 Tie rod
44 Drive
45 Spindle thread 46 Toothed rack (track)
5 Vehicle wheel
50 Carriageway
6 Position sensor apparatus
61 Rotation sensor
62 Sensor shaft
63 Bearing
64 Gear (running wheel)
65 Compensation element (resilient element)
66 Compensation element (resilient element)
67 Compensation element (resilient element)
L Longitudinal axis
A Axis (actuator axis)
S Sensor axis

What is claimed is:

1. A steering actuator for a steering system for a motor vehicle, the steering actuator comprising:
    an actuator rod that is displaceable in translation in a longitudinal direction of the actuator rod; and
    a position sensor apparatus that is configured to detect a linear position of the actuator rod, wherein the position sensor apparatus comprises a rotation sensor that includes:
        a sensor shaft that is rotatable about an axis;
        a running wheel that is configured to roll on a corresponding linear track of the actuator rod to convert a translational movement of the actuator rod into a rotation of the sensor shaft, wherein the running wheel is configured as a gear and the linear track is configured as a toothed rack; and
        a flexibly resilient compensation element arranged between tooth arrangements of the gear and the toothed rack;
    wherein the rotation sensor is flexible transversely relative to the linear track.

2. The steering actuator of claim 1 wherein the actuator rod is displaceably supported in an actuator housing.

3. The steering actuator of claim 1 wherein the rotation sensor is movably supported relative to the actuator rod.

4. The steering actuator of claim 1 wherein the running wheel is resiliently pretensioned against the linear track.

5. The steering actuator of claim 1 wherein the rotation sensor is resiliently pretensioned against the actuator rod.

6. The steering actuator of claim 1 comprising a motorized drive for translational displacement of the actuator rod.

7. The steering actuator of claim 1 comprising a rack and pinion steering gear mechanism having a rotatably drivable steering pinion that engages in a tooth arrangement of the actuator rod.

8. The steering actuator of claim 1, wherein the flexibly resilient compensation element includes a flexibly resilient coating on teeth of the gear.

9. The steering actuator of claim 1, wherein the flexibly resilient compensation element includes a flexibly resilient coating on teeth of the toothed rack.

10. The steering actuator of claim 1, wherein the flexibly resilient compensation element includes a thermoplastic elastomer material.

11. A steering system for a motor vehicle, the steering system comprising:
    at least one steerable wheel; and
    a steering actuator that includes:
        an actuator rod that is displaceable in translation in a longitudinal direction of the actuator rod; and
        a position sensor apparatus that is configured to detect a linear position of the actuator rod, wherein the position sensor apparatus comprises a rotation sensor that includes:
            a sensor shaft that is rotatable about an axis;
            a running wheel that is configured to roll on a corresponding linear track of the actuator rod to convert a translational movement of the actuator rod into a rotation of the sensor shaft, wherein the running wheel is configured as a gear and the linear track is configured as a toothed rack; and
            a flexibly resilient compensation element arranged between tooth arrangements of the gear and the toothed rack;
    wherein the rotation sensor is flexible transversely relative to the linear track;
    wherein the steering actuator is operationally connected to the at least one steerable wheel.

12. The steering system of claim 11 configured as a steer-by-wire steering system.

13. The steering system of claim 11 comprising an electrical control unit, wherein the rotation sensor is connected to the electrical control unit.

14. The steering system of claim 11, wherein the flexibly resilient compensation element includes a flexibly resilient coating on teeth of the gear.

15. The steering system of claim 11, wherein the flexibly resilient compensation element includes a flexibly resilient coating on teeth of the toothed rack.

16. The steering system of claim 11, wherein the flexibly resilient compensation element includes a thermoplastic elastomer material.

* * * * *